United States Patent [19]
Takashige et al.

[11] Patent Number: 5,158,637
[45] Date of Patent: Oct. 27, 1992

[54] METHOD OF AND AN APPARATUS FOR THERMALLY PROCESSING CRYSTALLINE THERMOPLASTIC RESIN FILM

[75] Inventors: Masao Takashige; Takeo Hayashi; Katsumi Utsuki; Masahiro Fujimoto, all of Himeji, Japan

[73] Assignee: Idemitsu Petrochemical Co., Ltd., Tokyo, Japan

[21] Appl. No.: 583,076

[22] Filed: Sep. 14, 1990

[30] Foreign Application Priority Data

Sep. 20, 1989 [JP] Japan .................................. 1-245771
Oct. 11, 1989 [JP] Japan .................................. 1-265517

[51] Int. Cl.$^5$ .............................................. B29C 55/28
[52] U.S. Cl. ........................ 156/244.11; 156/244.13;
156/244.14; 156/244.18; 156/244.19;
156/244.23; 156/244.24; 156/250; 156/256;
156/500; 156/510; 156/512; 264/209.1;
264/209.5; 264/210.5; 264/210.7; 425/113;
425/133.1
[58] Field of Search ............... 156/244.11, 244.13,
156/244.14, 244.18, 244.19, 244.23, 244.24, 500,
510, 512, 250, 256; 425/113, 133.1; 264/209.1,
209.5, 210.5, 210.7, 209.8, 177.16, 521, 567

[56] References Cited

U.S. PATENT DOCUMENTS

| 3,576,658 | 4/1971 | Notomi et al. | 156/198 |
| 3,577,497 | 5/1971 | Matsuyu et al. | 264/567 |
| 4,432,917 | 2/1984 | Hungerford | 264/210.5 |
| 4,704,238 | 11/1987 | Okuyama et al. | 264/567 |
| 4,983,337 | 1/1991 | Kojoh et al. | 264/209.5 |

FOREIGN PATENT DOCUMENTS 46-15439  4/1971  Japan .

Primary Examiner—Caleb Weston
Attorney, Agent, or Firm—Flynn, Thiel, Boutell & Tanis

[57] ABSTRACT

A method of and an apparatus for biaxially orienting a crystalline thermoplastic resin film and subsequently thermally processing the film with first and second heating devices, in which the temperatures of respective heaters for biaxially orienting the film are separately controlled, the first heating device being operated by a tubular method or a tenter method, and the second heating device being operated under a tenter method and above the temperature in the first heating device, whereby a melting and sticking of the film is prevented and the bowing ratio is decreased.

17 Claims, 4 Drawing Sheets

METHOD OF AND AN APPARATUS FOR THERMALLY PROCESSING CRYSTALLINE THERMOPLASTIC RESIN FILM

BACKGROUND OF THE INVENTION

1. Field of the Invention

The present invention relates to a process of and an apparatus for thermally processing a crystalline thermoplastic resin film and is applicable to such industrial fields as packing foods and industrial products and lining bag-in-boxes and drums with the film.

2. Description of the Related Art

A plastic film is generally biaxially oriented by a tubular method and subsequently thermally processed to fix its molecular orientation or obtain stable dimensions thereof.

Under the process, when thermally processing a tubular film, for example Nylon - 6 film, in a flat shape by a tenter method at about 200 ° C., the upper and lower films melt and adhere to each other, so that the adhered films cannot be divided into two portions for use as products. This problem becomes formidable when using such a crystalline thermoplastic resin film as polyamidies.

A modified tenter method (Japanese Patent Publication No. 46-15439) has already been conceived to overcome this problem, in which a biaxially oriented film in flat shape is cut out to be divided into two films at its lug portions, the cut films are conveyed by an endless conveyer to a tenter device with a certain space therebetween, and the films are still thermally processed while both side portions thereof are clipped in the tenter device (Japanese Patent Publication No. 46-15439).

Additionally, it is also possible to employ another method to avoid the aforementioned problem. The other method is a tubular method in which a tubular film is thermally processed while pressurized air is fed thereinto.

According to the modified tenter method, the two films do not adhere to each other, but a so-called bowing appearance is produced (a middle portion of a film is delayed in being elongated in its moving direction compared with its side portions while hardening), whereby there results some sags which may cause some harm to the anisotropy of and secondary processing (e.g., printing) of the film. It is of course recognized that if the temperature for thermally processing through the method is controlled to be at a low level, the bowing appearance is suppressed. However, when thermally processing by boiling, retorting and the like, there may be a problem owing to a high contraction ratio of the film.

According to the tubular method, there is a problem that if the thermal process is executed over 180° C. to achieve a high dimensional stability, the film bubble may flare to thereby make it difficult to maintain a constant process. If the method is done at a low temperature to avoid this problem, high dimensional stability cannot be attained.

The applicant has described a method of and an apparatus for thermally processing, within two steps, a crystalline thermoplastic resin film which is biaxially oriented by a tubular method in Japanese Patent Application No 63-296575. In this application, the second thermal process is limited to the use of a tenter method, but the first thermal process is not limited in detail.

An object of the present invention is to provide a method of and an apparatus for thermally processing a crystalline thermoplastic resin film which avoids the melting and sticking of the film and diminishes the bowing ratio thereof.

SUMMARY OF THE INVENTION

According to the present invention, a method of thermally processing a crystalline thermoplastic resin film includes the steps of: biaxially orienting the crystalline thermoplastic resin film by a tubular method; thermally processing the film at a predetermined temperature as a first thermal process; dividing the film into two parts by cutting its side portions; laminating the two film parts with air provided between them; and thermally processing the film parts, as a second thermal process, above the temperature of the first thermal process and below the melting point of the film by means of a tenter method.

According to the present invention, an apparatus for thermally processing a crystalline thermoplastic resin film includes: an arrangement for biaxially orienting a crystalline thermoplastic resin film by a tubular method; a first heating arrangement for thermally processing the film at a predetermined temperature; a trimming arrangement for dividing the film into two parts by cutting its side portions; an arrangement for laminating the two film parts with air provided between them; and a second heating arrangement for thermally processing the film parts above the temperature in the first heating arrangement and below the melting point of the film.

In the above method and apparatus, the temperature of one heater to heat the lug portions of a crystalline thermoplastic resin film may be lower than the temperature of the other heater to heat a portion of the film used as a product. In particular, the temperature for the former heater may be 10° to 100° C. lower than the average temperature of all the heaters and the temperature for the latter heater may be 10° to 100° C. higher than the average temperature of all the heaters.

If the temperature difference between the temperature of the former or latter heater and the average temperature of all the heaters is less than 10° C., an effect of the invention, that is to say a bowing appearance toward the opposite direction, cannot be obtained. Otherwise, if the temperature difference between the temperature of the former or latter heater and the average temperature of all the heaters is more than 100° C., the biaxially orienting of a formed bubble becomes unstable.

In order to separately control the temperature of the former and latter heaters, it may be preferable that there are respectively provided at least two heaters as the former and second heaters.

If it is necessary to achieve precise temperature control of the former and latter heaters to make the temperature gradient on the whole periphery of the film even, the heating device should include more than four heaters In this operation, the temperature of the heater to heat the lug portions of the film should be controlled to be the lowest temperature in the heaters, and the temperature of the heater to heat the portion of the film used as a product should be controlled to be the maximum temperature in the heaters.

The first heating arrangement can be operated under a tubular method at a temperature at which the film begins to contract and below a temperature of at least 20° C., preferably 30° C., less than the melting point of the film. Alternatively, it can be operated under a tenter method at a temperature at which the film begins to contract and below a temperature of at least 30° C. on or less than the melting point of the film. The reason why the temperature of the first heating arrangement, under a tenter method, is not less than the temperature at which the film begins to contract is to prevent a large curling of the film for clipping the side portions of the film.

If the heating temperature of the heater goes over the temperature of at least 20° C. less than the melting point, the film will melt and make it impossible to divide the film into two parts after the thermal process. The time duration for heating should be more than one second, because, if it is less than one second, the thermosetting of the film tends to be insufficient. The upper limit of the time duration is not particularly set, however, 1 to 30 seconds duration is preferable to save the cost of constructing a relatively large system.

Under the first heating arrangement, a stretching of the film may be set to 0 to 10% in the direction of a Machine Direction (MD) and/or a Transverse Direction (TD). The crystallinity of the film is remarkable and the contraction ratio decreases due to the relative stretching of the film through the heating process to produce a film having stable dimensions.

The second heating arrangement, under the tenter method, should not be operated at a lower temperature than the temperature of the first heating arrangement because of the high contraction ratio of the film. If the temperature is more than the melting point of the film, melting of the film occurs. It is, therefore, difficult to divide the film into two parts after thermal processing. The time duration for heating is the same as in the first heating arrangement. The stretching of the film is also set to be 0 to 10% as in the first heating arrangement.

Some examples of the crystalline thermoplastic resin film are polyamides, polyesters, ethylene-vinylalcohol copolymers, polystyrene resins and the like. Some examples of polyamide resins are Nylon-6 (Contraction beginning temperature of 45° C., Melting point of 215° C.), Nylon-66 (Contraction beginning temperature of 55° C., Melting point of 260° C.) and so on.

The air-injecting arrangement for forming the film into a bubble shape by the tubular method may depend upon necessities.

The first and second heating arrangements each may be provided with an air-heating furnace having the features of high heating efficiency and uniform heating.

The rollers, which are used when the divided film parts are laminated to each other while air is placed between them, preferably have grooves thereon to make the air placement certain and a plating provided on its surface so as not to ruin the film.

DETAILED DESCRIPTION OF THE PREFERRED EMBODIMENTS

The preferred embodiments of a method of and an apparatus for thermally processing a crystalline thermoplastic resin film will hereunder be described with reference to FIGS. 1 to 8.

FIRST EMBODIMENT

Figure 1:
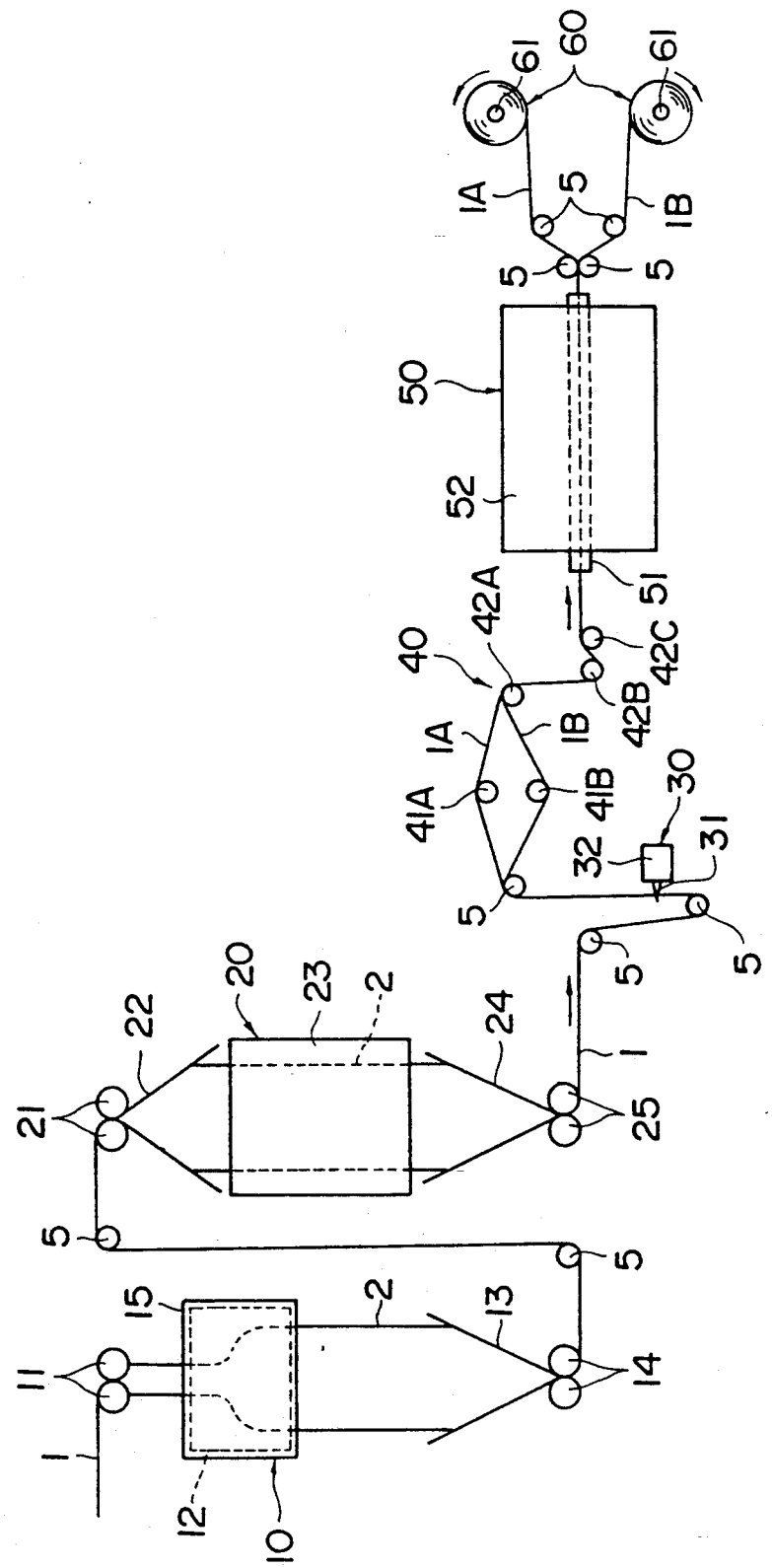
FIG. 1 is a schematic diagram of an apparatus for thermally processing a film according to a first embodiment of the present invention.
Figure 2:
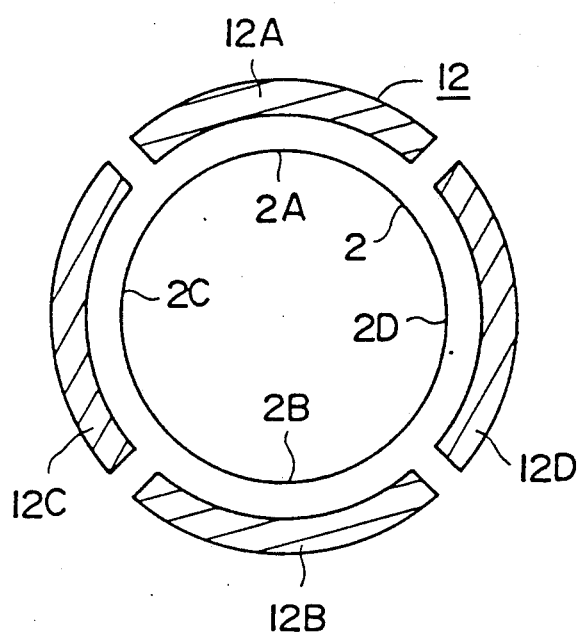
FIG. 2 is a fragmentary sectional view showing a bubble being heated by a heater.
Figure 3:
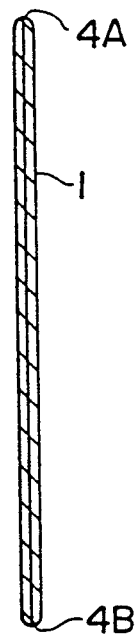
FIG. 3 is a sectional view of the bubble in a flat shape.
Figure 4:
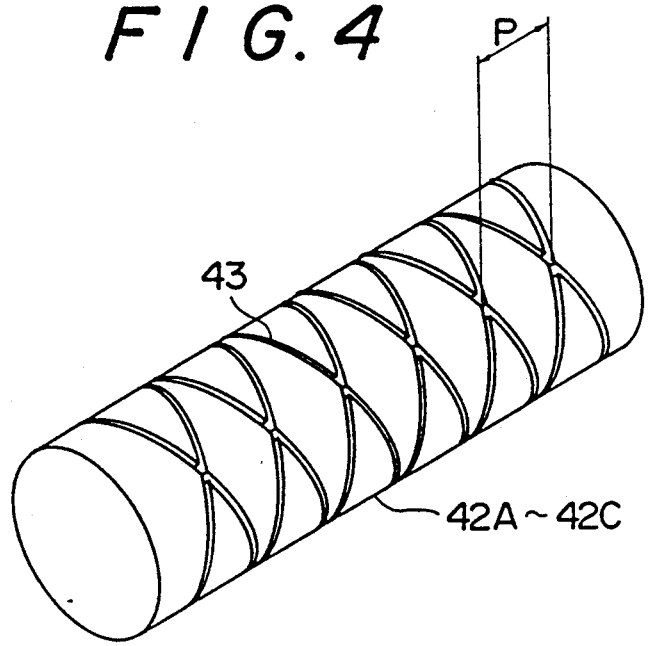
FIG. 4 is a perspective view of a roller having grooves thereon.

The apparatus shown in FIG. 1 as the first embodiment has an arrangement 10 for biaxially orienting a crystalline thermoplastic resin film 1 by a tubular method, a first heating arrangement 20 for performing a first thermal process, a trimming arrangement 30 for dividing the film 1 into two parts 1A, 1B by cutting out both side portions of the film 1, an arrangement 40 for laminating the two films 1A, 1B together while keeping air between them, a second heating arrangement 50 including a tenter 51 capable of clipping respective sides of each of the two films 1A, 1B together to perform a second thermal process, and an arrangement 60, which is provided by necessity, for winding up the films 1A, 1B after they have been thermally processed.

As used herein, the term "laminate" refers to a layered arrangement of the film parts 1A and 1B with air provided between them, but does not require any physical connection between the layers.

The arrangement 10 includes a set of first pinch rollers 11 at an upper portion thereof, a heating furnace 15 provided with heaters 12 for heating the film 1, a V-shaped guide plate 13 for folding the film 1 into a flat shape, and a set of second pinch rollers 14 at a lower end portion of the guide plate 13.

The heaters 12 in the heating furnace 15 consist of four heaters 12A, 12B, 12C, 12D each disposed adjacent to the periphery of the bubble 2 at a common interval. A set of heaters 12A, 12B, opposed to each other among the heaters 12A, 12B, 12C, 12D, are used for heating the portions 2A, 2B which become lug portions 4A, 4B of the film 1 when folding the bubble 2 into the flat shape. The other set of heaters 12C, 12D are used for heating the portions 2C, 2D which are portions of the bubble 2 ultimately used as products. These heaters 12A, 12B, 12C, 12D may be, for example, infrared heaters. Some guide rollers 5 are properly provided between the arrangement 10 and the first heating arrangement 20.

The first heating arrangement 20 has a set of first pinch rollers 21, a guide plate 22 adjacent to the first pinch rollers 21 and having an inverted V-shape, an air-heating furnace 23 for heating the film 1, a V-shaped guide plate 24 for folding the film 1 into flat shape, and a set of second pinch rollers 25 disposed at a lower end portion of the guide plate 24.

The trimming arrangement 30 includes a trimming device 32 having a blade 31.

The arrangement 40 for laminating the films 1A, 1B with air between them has a guide roller 5, a set of rollers 41A, 41B positioned at an upper and lower side of the film, and three rollers 42A, 42B, 42C each having grooves thereon and arranged in a line in the moving direction of the films 1A, 1B. The rollers 42A, 42B, 42C each have two oppositely angled grooves 43 which intersect with each other every P=10 cm pitch thereon and further have a metal plating on their surface.

The second heating arrangement 50 for the second thermal process has a tenter 51 for clipping the films 1A. 1B in a laminated state at both side portions 4A, 4B and an air-heating furnace 52 for heating the films 1A, 1B.

The arrangement 60 includes two wind-up devices 61 for winding up the thermally processed films 1A, 1B, respectively.

Thermal processing of the film 1 by the aforementioned apparatus is performed as follows.

In the arrangement 10 under the tubular method, the tubular film 1, which is heated by a plurality of the heaters 12 in the heating furnace 15, is biaxially oriented so that the film 1 is formed into the bubble 2 and drawn in the transverse direction (TD) by inflation by a desirable air pressure, and the film 1 is successively drawn in the machine direction (MD) by the differential in pulling speeds between the upper and lower pinch rollers 11, 14. The biaxially oriented film 1 is folded into a flat shape by the guide plate 13 and the second pinch roller 14. A suitable method of injecting air into the film 1 during the tubular method is disclosed in Japanese Patent Laid-open Publication No. 64-71727.

Figure 5:
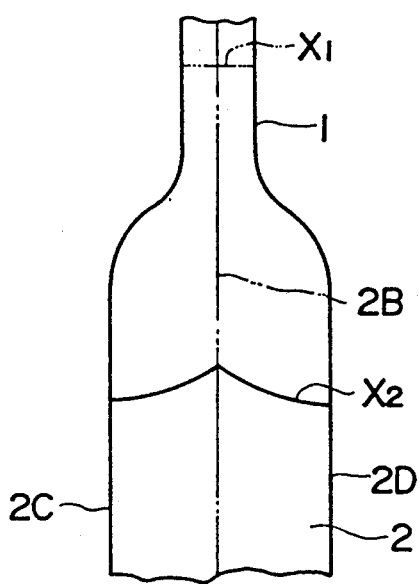
FIGS. 5 and 6 are respectively a front view and a side view showing a bowing appearance in an opposite direction through biaxial orientation.
Figure 6:
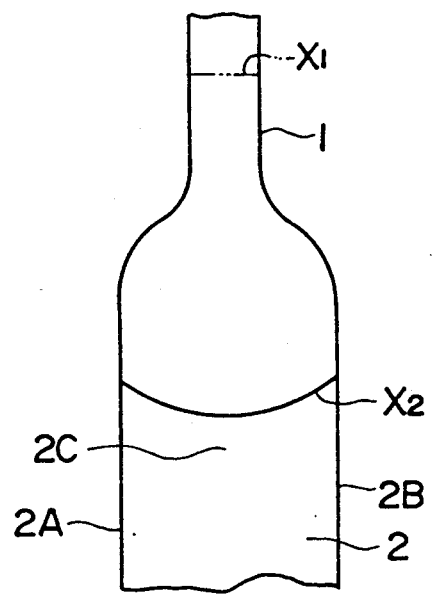

While heating the film 1 by the heating furnace 15, the heaters 12A, 12B, corresponding to the portions 2A, 2B serving as lug portions of the film 1, are controlled to have a temperature 10° to 100° C. lower than the average temperature of all the heaters 12A, 12B, 12C, 12D. The heaters 12C, 12D, corresponding to the portions 2C, 2D of the film 1 ultimately used as products, are controlled to have a temperature of 10° to 100° C. higher than the average temperature of all the heaters 12A, 2B, 12C, 12D. When heating and drawing the film 1 under such a condition, as shown in FIGS. 5 and 6, a bowing appearance toward the opposite direction comes into effect, in which the straight line $X_1$ lined toward the TD direction of the film 1 before orientation is curved toward the MD direction around the center between the portions 2C and 2D, corresponding to ultimate products of the bubble 2, as shown by curved line $X_2$.

The folded film 1 is advanced to the first heating arrangement 20 at which the air-heating furnace 23 thermally processes the bubble 2 above a temperature at which the film 1 begins to contract and below a temperature of 20° C. lower than the melting point of the film. The crystallinity of the film 1 becomes remarkable due to the first thermal process, so that a good sliding between the films can be attained and, thereby, adhesion between the films can be prevented. Besides, the first thermal process is done by the tubular method, so that the bowing ratio of the final film 1 is decreased.

The thermally processed film 1 is cut into two parts 1A, 1B at both of its side portions with the blade 31 of the trimming device 32. The cutting of the film 1 while flat may be done at locations spaced inwardly from both edge portions of the film 1 so as to make narrow lug portions of the film 1. Otherwise, it may be preferable to position the blade 31 at the folds of the folded film 1 so as not to make such lug portions. Trimming at this step is useful to decrease the trimming loss at a latter process step.

The trimmed film 1 is advanced into the arrangement 40 for laminating the films 1A and 1B with air provided between them, wherein the films 1A, 1B are separately fed by the rollers 41A, 41B to contact the air on the inner surface of the films 1A and 1B. The films 1A and 1B are laminated together by the three rollers 42A, 42B, 42C, each having grooves provided thereon, while keeping air between the two films. Accordingly, by using the rollers 42A, 42B, 42C, the grooves 43 work well to maintain a desirable contact with air for the rollers to thereby effectively prevent the adhesion of the two films 1A and 1B.

The films 1A and 1B laminated together are further advanced to the second heating arrangement 50. The films 1A, 1B are clipped by the tenter 51 at their lug portions 2A, 2B and thermally processed at a temperature above the temperature of the first thermal process and below the melting point of the film 1. Through this process, the contrary bowing appearance under the biaxially orienting is canceled to some extent and therefore each of the bowing ratios of the films 1A, 1B become small. The stretching of the films 1A, 1B, in the second thermal process is also set at 0 to 10% as in the first heating arrangement.

The films 1A, 1B are finally wound up by the two wind-up devices 61 respectively via the guide rollers 5 in arrangement 60.

According to the embodiment, some operative examples and control examples will be described when a crystalline thermoplastic resin film 1 is thermally processed under certain conditions.

OPERATIVE EXAMPLES 1 TO 7

The inventors have realized the first embodiment by using a roll-stock Ube-nylon (Trademark, Relative viscosity of 3.7) as a polyamide nylon-6, extruding the nylon at 15kg/hr by means of an extruder with a screw having a diameter of 40 mm, and rapidly cooling the nylon thereafter in cooling water of 15° C. to thereby obtain a tubular nylon film (Contraction beginning temperature of 45° C., Melting point of 215° C.) having a diameter of 90 mm and a thickness of 135μ.

The rollstock nylon film 1 is formed into a nylon film 1 in a flat shape having a thickness of 15 μ by being biaxially oriented at a drawing magnification of MD/TD=3.0/3.2 and subsequently folded.

As shown in Table-1, the nylon film 1 is thermally processed by first and second heating arrangements 20, 50 at various process temperatures and stretchings. The nylon film 1 obtained after the thermal process is measured from its contraction ratio (at 95° C. and 115° C.) and bowing ratio, examined for the presence of adhesion and finally judged as to whether the film 1 is a success or failure as shown in Table-1.

Figure 7A:
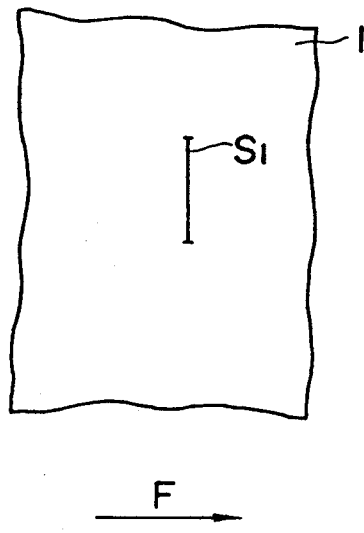
FIGS. 7(A) and 7(B) are each a fragmentary view of a piece of film showing the technique for measuring a bowing ratio.
Figure 7B:
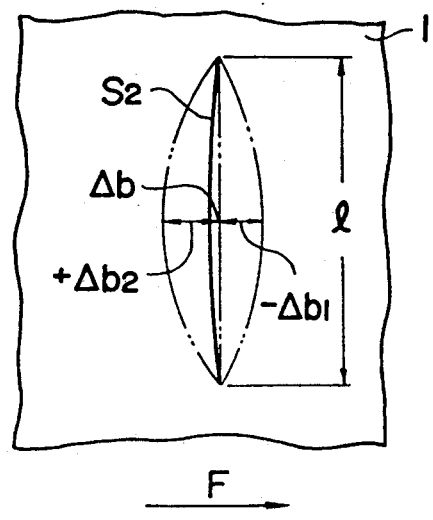

The bowing ratio is explained with reference to FIG. 7, in which a marked line $S_1$ (FIG. 7A) is oriented so as to intersect with a moving direction F of the film 1, and in which a marked line $S_2$ (FIG. 7B) is the marked line $S_1$ after the second thermal process. The bowing ratio is given by an equation of $\Delta b/l \times 100\%$, b being a delay or offset of the middle of line $S_2$ and l being a length of the line $S_2$. In the invention, $-\Delta b_1$ of the contrary bowing appearance comes out into the opposite direction by the biaxial orientation and $+\Delta b_2$ of the bowing appearance subsequently comes out by the first and second thermal processes, whereby the $\Delta b$ after the second thermal process is $|\Delta b_2 - \Delta b_1|$.

In the Table-1, ○ means the presence of adhesion of the film and ✕ means an absence of adhesion of the film under the item of "Adhesion". In the item showing a judgment of success or failure; ⊙ means a non-adhesive state, a bowing ratio of or below 5%, and a ratio of or below 5% (at 115° C.); ○ means a non-adhesion state, a bowing ration of or above 5%, and a Contraction ratio above 5% (at 115° C.); and ✕ means an adhesion presence state and a contraction ratio above 5%.

CONTROL EXAMPLES 1, 2

In these control examples 1, 2, the rollstock film is biaxially oriented after producing a tubular nylon film from the Nylon-6 such as that in the first embodiment.

The film is processed the same as that in the first embodiment, except with respect to the first thermal process.

As shown in Table-1, the contraction ratio (at 95° C. and 115° C.) and bowing ratio are measured, the presence of adhesion is examined, and a final judgment is made for the nylon film in the control examples.

TABLE 1

|  | First thermal process | | Second thermal process | | Contraction ratio (%) | | Adhesion | Bowing ratio | | Judgement |
|---|---|---|---|---|---|---|---|---|---|---|
|  | Temperature (°C.) | Stretching ratio (%) | Temperature (°C.) | Stretching ratio (%) | 95° C. | 115° C. |  | First | Second |  |
| Operative exam. 1 | 60 | 0 | 210 | 10 | 2 | 4 | ○ | 0% | 5.5% | ○ |
| Operative exam. 2 | 100 | 0 | 210 | 10 | 2 | 4 | ○ | 0 | 5.0 | ⊙ |
| Operative exam. 3 | 150 | 0 | 210 | 10 | 2 | 4 | ○ | 0 | 4.5 | ⊙ |
| Operative exam. 4 | 180 | 0 | 210 | 10 | 2 | 4 | ○ | 0 | 4.0 | ⊙ |
| Operative exam. 5 | 180 | 5 | 210 | 5 | 2 | 4 | ○ | 0 | 3.5 | ⊙ |
| Operative exam. 6 | 180 | 0 | 210 | 5 | 3 | 6 | ○ | 0 | 3.0 | ○ |
| Operative exam. 7 | 180 | 0 | 210 | 0 | 4 | 8 | ○ | 0 | 2.5 | ○ |
| Control exam. 1 | — | — | 210 | 10 | 2 | 4 | ✕ | — | 9.5 | ✕ |
| Control exam. 2 | — | — | 210 | 5 | 4 | 8 | ✕ | — | 8.0 | ✕ |

According to Table-1, the nylon film 1 in each operative example is thermally processed by the tubular method at a temperature of 60° to 180° C. as the first thermal process and subsequently processed by the tenter method at 210° C., so that adhesion of the film does not occur, the bowing ratio becomes low, and the judgment results in ○ or ⊙.

On the other hand, the nylon film in each control example exhibited the presence of adhesion, a high bowing ratio and the judgment of ✕ because of only processing under a tenter method.

The air-heating furnaces 23, 52 for the first and second heating arrangement 20, 50 may each be an infrared heater.

According to the method of and the apparatus for thermally processing a crystalline thermoplastic resin film, there is no presence of adhesion and the thermal process for thermoset can be done, so that the bowing ratio becomes low and film 1 stable in dimensions can be produced reliably.

SECOND EMBODIMENT

Figure 8:
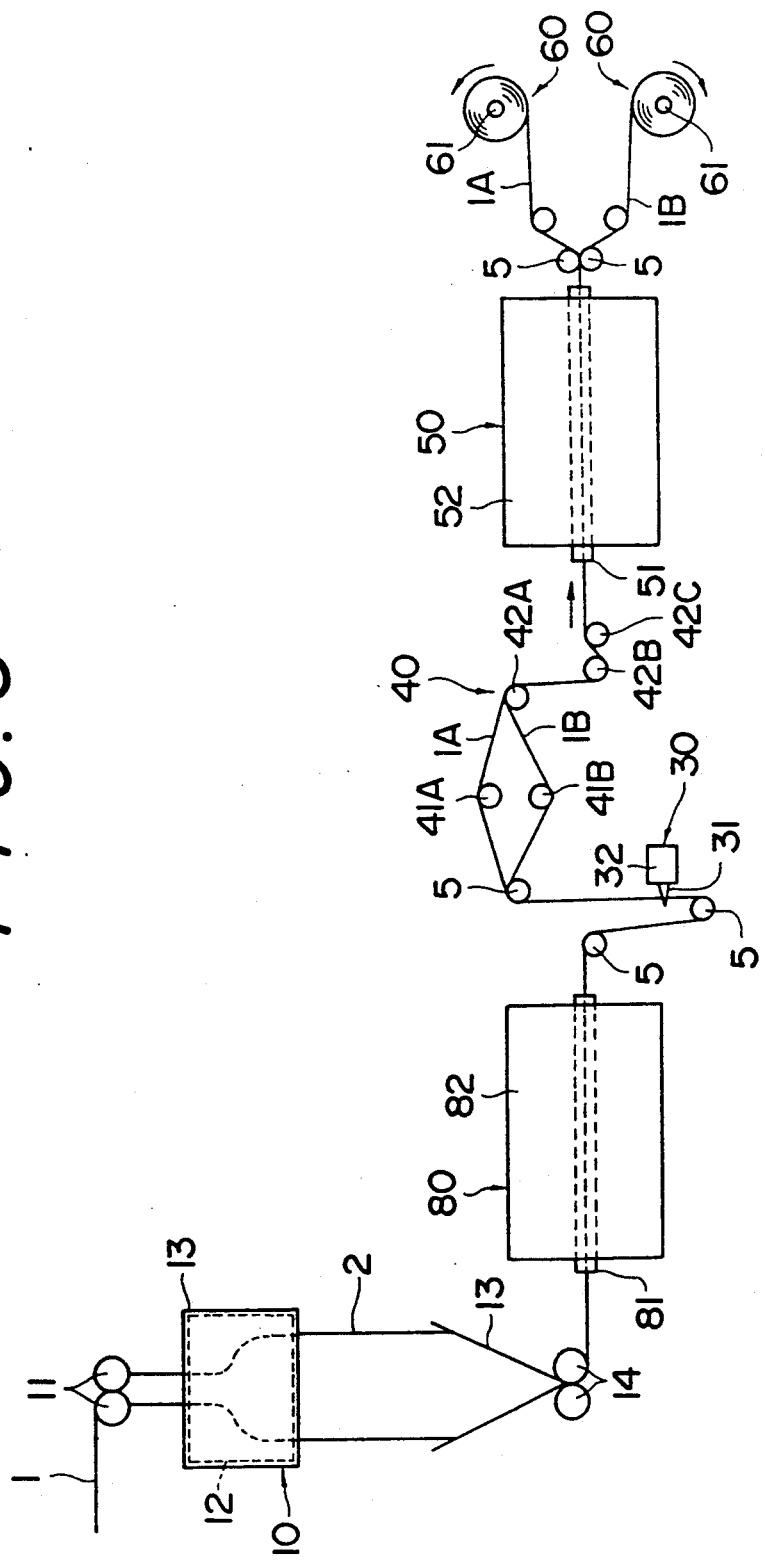
FIG. 8 is a schematic diagram of an apparatus for thermally processing a film according to a second embodiment of the present invention.

With reference to FIG. 8, a second embodiment of the present invention will hereinafter be described. The descriptions for processes and constructions also present in the first embodiment are diminished or made simple.

An apparatus of the second embodiment has an arrangement 10 for biaxially orienting a crystalline thermoplastic resin film 1 under a tubular method, a first heating arrangement 80 for thermally processing the film 1 under a tenter method, a trimming arrangement 30 for dividing the film 1 into two parts 1A and 1B by cutting both lug portions of the film 1, an arrangement 40 for laminating both films 1A and 1B with air provided between them, a second heating arrangement 50 for thermally processing the films 1A and 1B laminated together under a tenter method, and an arrangement 60 for respectively winding up the films 1A and 1B after they are thermally processed.

The difference between the apparatuses in the first and second embodiments is the first heating arrangement 80 for executing the first thermal process.

The first heating arrangement 80 is provided with a tenter 81 for clipping the film 1 in a flat shape at its lug portions 4A, 4B and with an air-heating furnace 82 for heating the film 1. The air-heating furnace 82 is the same as the air-heating furnaces 23, 52 provided for the first and second heating arrangements 20, 50 in the first embodiment.

When operating the apparatus, including the difference for thermally processing the crystalline thermoplastic resin film 1, the film 1 is processed, at the first thermal process, by the air-heating furnace 82 at a temperature of or lower than 30° C. below the melting point of the film 1 while clipping the film 1 at its lug portions 4A, 4B with the tenter 81. In this process, the bowing appearance comes out so as to cancel the contrary bowing appearance produced by the biaxial orientation.

In this thermal process, the stretching of the film 1 should be set 0 to 10% (MD and/or ID). Because the film 1 is thermally processed while being relatively relaxed, the crystallinity of the film 1 is increased and the Contraction ratio is decreased, so that the film 1 stable in dimensions can be produced reliably.

The following are descriptions for operative examples and control examples, when executing the thermal process of a crystalline thermoplastic resin film 1 under some conditions.

OPERATIVE EXAMPLES 8 TO 13

The inventors have realized the second embodiment by using a roll-stock Ube-nylon (Trademark, Relative viscosity of 3.7) as a polyamide nylon-6, extruding the nylon at 15kg/hr by means of a extruder with a screw having a diameter of 40 mm, and rapidly cooling the nylon thereafter in cooling water of 15° C. to thereby obtain a tubular nylon film (Contracting beginning temperature of 45° C., Melting point of 215° C.) having a diameter of 90 mm and a thickness of 135 μ.

The rollstock nylon film 1 is formed into a nylon film 1 in a flat shape having a thickness of 15 μ by being biaxially oriented at the drawing magnification of MD/TD=3.0/3.2 and subsequently folded. The temperature of the heaters 12A, 12B for the portions 2A, 2B, corresponding to lug portions 4A, 4B of the film 1, and the temperature of the heaters 12C, 12D for the portions 2C, 2D of the film 1 are set as shown in Table-2.

The process temperature and the stretching ratio in each operative example are set as shown at the items of the first and second thermal process in Table-2. Each first thermal process of the operative examples 8 to 12 is done by the tenter method, while the first thermal process of the operative example 13 is done by the tubular method.

Table-2 shows the evaluation of the forming stability of the bubble 2 at the biaxial orientation, the bowing ratio of the nylon film 1 and of the nylon films 1A, 1B after the second thermal process, and the final judgment of whether the films 1A and 1B are a success or failure.

bowing ratio above 5% after the second thermal process.

CONTROL EXAMPLES 3 TO 7

In these control examples, the rollstock film 1 is biaxially oriented after producing a tubular nylon film from the Nylon-6 such as that in the second embodiment The temperature of the heaters 12A, 12B for the portions 2A, 2B corresponding to lug portions 4A, 4B of the film 1 and the temperature of the heaters 12C, 12D for the portions 2C, 2D of the film 1 are set as shown in Table-2.

The nylon film 1 is processed through the first and second thermal processes at the temperature and the stretching shown in Table-2, while the rest of the process is the same as the second operative example. In the control example 7, the first thermal process is not done.

As shown in Table-2, the forming stability of the bubble 2 at the biaxial orientation is examined, bowing ratio of the nylon film 1 after drawing and of the nylon films 1A, 1B after the second thermal process is measured, and a final judgment is made for the nylon film in the control examples

TABLE 2

|  | Heater temperature | | Forming stability of bubble | First thermal process | | Second thermal process | | Bowing ratio | | Judgement |
|---|---|---|---|---|---|---|---|---|---|---|
|  | Lug portions | Product portions | | Temperature | Stretching ratio | Temperature | Stretching ratio | After drawing | After thermal process | |
| Operative exam. 8 | 280° C. | 320° C. | ○ | 100° C. | 5% | 210° C. | 5% | −0.5% | 5.0% | ○ |
| Operative exam. 9 | 260° C. | 340° C. | ○ | 100° C. | 5% | 210° C. | 5% | −1.0% | 4.5% | ◎ |
| Operative exam. 10 | 240° C. | 360° C. | ○ | 100° C. | 5% | 210° C. | 5% | −1.6% | 3.9% | ◎ |
| Operative exam. 11 | 220° C. | 380° C. | ○ | 100° C. | 5% | 210° C. | 5% | −1.9% | 3.6% | ◎ |
| Operative exam. 12 | 200° C. | 400° C. | Δ | 100° C. | 5% | 210° C. | 5% | −2.4% | 3.1% | ○ |
| Operative exam. 13 | 260° C. | 340° C. | ○ | 150° C. | 0% | 210° C. | 10% | −1.0% | 3.5% | ◎ |
| Control exam. 3 | 300° C. | 300° C. | ○ | 100° C. | 5% | 210° C. | 5% | 0% | 5.5% | x |
| Control exam. 4 | 320° C. | 280° C. | ○ | 100° C. | 5% | 210° C. | 5% | +0.6% | 6.1% | x |
| Control exam. 5 | 340° C. | 260° C. | ○ | 100° C. | 5% | 210° C. | 5% | +1.1% | 6.6% | x |
| Control exam. 6 | 180° C. | 420° C. | x | 100° C. | 5% | 210° C. | 5% | −2.6% | 2.9% | x |
| Control exam. 7 | 260° C. | 340° C. | ○ | — | — | 210° C. | 5% | −1.1% | 6.9% | x |

In the item of the forming stability of the bubble, ○ means a lay-flat width on or below ±1% and a non-breaking out of and an unstable appearance (an up-and-down motion, a sideways shake and the like) of the bubble, Δ means a lay-flat width on or below ±3% and a non-breaking out of and an unstable appearance (an up-and-down motion, a sideways shake and the like) of the bubble, and ×means a difficulty of a continuous stable forming of the film owing to the presence of the breaking out of and an unstable appearance (an up-and-down motion, a sideways shake and the like) of the bubble. In the item showing a judgment of success or failure; ◎ means a ○ state of the forming stability and a bowing ratio on or below 5% after the second thermal process; ○ means a ○ state of the forming stability and a bowing ratio on or above 5% after the second thermal process, or a Δ state of the forming stability and a bowing ratio below 5% after the second thermal process; and ×means a ×state of the forming stability and a According to each operative example in Table-2, because the temperature of the heaters 12A, 12B for the portions 2A, 2B corresponding to lug portions 4A, 4B of the film 1 are set 20° to 100° C. lower than the average temperature (300° C.) of all the heaters and the temperature of the heaters 12C, 12D for the portions 2C, 2D of the film 1 are set 20° to 100° C. higher than the average temperature, the bubble 2 is kept stable during the biaxial orientation, the final bowing ratio becomes low after the second thermal process, and the judgments result in ○ or ◎. Accordingly, the bowing ratio can be suppressed to thereby obtain films 1A and 1B which are good in their anisotropy.

According to control example 3, the difference between the temperature of the heaters 12A, 12B for the portions 2A, 2B corresponding to lug portions 4A, 4B of the film 1 and the temperature of the heaters 12C, 12D for the portions 2C, 2D of the film 1 is small and still yields the average temperature (300° C.) of all the heaters to thereby cancel the contrary bowing appearance, whereby the bowing ratio after the second thermal process becomes high.

According to the control examples 4, 5, the temperature of one set of the heaters 12A, 12B is set higher than the average temperature (300° C.) of all heaters and the other set of the heaters 12C, 12D is set lower than the average temperature (300° C.) of all the heaters to thereby bring about the ordinary bowing appearance, whereby the final bowing ratio becomes high.

According to the control examples 6, the temperature of one set of the heaters 12A, 12B is set over 100° C. lower than the average temperature (300° C.) of all the heaters and the other set of the heaters 12C, 12D is set over 100° C. higher than the average temperature (300° C.) of all the heaters. The forming stability of the bubble 2 becomes poor, while the contrary bowing appearance is present and the final bowing ratio becomes low.

According to control example 7, the temperature of one set of heaters 12A, 12B and of the other set of heaters 12C, 12D belongs to the desirable region of the temperature in the present invention, and thereby the contrary bowing appearance can be recognized. But, the final bowing ratio becomes high because the first thermal process is not done.

In the first and second embodiments, the heaters 12 are divided into 4 portions and one set of the heaters 12A, 12B and the other set of the heaters 12C, 12D are separately controlled. However, the heaters can be implemented with 10 heaters in which two heaters are provided at each of the portions 2A, 2B corresponding to the lug portions 4A, 4B of the bubble 2 and in which three heaters are provided at each of the portions 2C, 2D corresponding to the portions ultimately used as products, whereby the controllability of heating the bubble 2 will be improved and the changes of the temperature on the whole periphery of the film will be more gradual.

The heater 12 can have not only a construction capable of being divided into several parts, but can be modified by changing the winding times of the coil of the infrared heater in order to respectively control the heating temperature toward portions 2A, 2B, corresponding to lug portions 4A, 4B, and toward portions 2C, 2D corresponding to the portions used as products.

Furthermore, the crystalline thermoplastic resin film used in the first and second embodiments may be a multi-layered film.

Accordingly, the bowing appearance owing to thermal processing can be suppressed as by the first embodiment, therefore obtaining a film having a good anisotropy.

What is claimed is:

1. A method of thermally processing a crystalline thermoplastic resin film comprising the steps of:
    biaxially orienting said crystalline thermoplastic resin film by a tubular method by forming a bubble of said resin film having first portions and second portions by heaters having two different temperature distributions, one heater heating said first portions of said bubble corresponding to portions of said film to be folded portions to a temperature lower than the average temperature of the heaters and another heater heating second portions of said bubble corresponding to portions of said film to be product portions to a temperature higher than the average temperature of the heaters, so that a minus bowing ratio is formed at the folded portion of the film and a positive bowing ratio is formed at the product portions of the film;
    folding the biaxially oriented crystalline thermoplastic resin film and advancing the folded film to a first thermal processing arrangement;
    heating the biaxially oriented film at said first thermal processing arrangement to a temperature lower than the melting temperature of said film so that the bowing ratio at the folded portions of said film decreases;
    forming the film into two parts by cutting the film at said folded portions;
    forming a laminate of the two parts of the film with air provided therebetween by plural sets of rollers having grooves provided on the periphery thereof; and
    advancing the laminate to a second thermal processing arrangement at which the laminate is heated to a temperature higher than the temperature of the first thermal processing arrangement but lower than the melting temperature of said film so that the bowing ratios of the film parts become smaller to produce a product crystalline thermoplastic resin film.

2. The method of thermally processing a crystalline thermoplastic resin film according to claim 1, wherein the first thermal processing arrangement is carried out by means of a tenter method above a temperature at which said film begins to contract and below a temperature of at least 30° C. below the melting point of said film.

3. The method of thermally processing a crystalline thermoplastic resin film according to claim 1, wherein the temperature of the heater to heat the folded portions of said film is 10° to 100° C. lower than an average temperature of all the heaters.

4. The method of thermally processing a crystalline thermoplastic resin film according to claim 1, wherein the temperature of the heater to heat the portion of said film used as a product is 10° to 100° C. higher than an average temperature of all the heaters.

5. The method of thermally processing a crystalline thermoplastic resin film according to claim 1, wherein the temperature of the heater to heat the lug portions of said film is a lowest temperature in the heaters, and wherein the temperature of the heater to heat the portion of said film used as a product is a maximum temperature in the heaters.

6. The method of thermally processing a crystalline thermoplastic resin film according to claim 1, wherein the first thermal processing arrangement is carried out by a tubular method above a temperature at which said film begins to contract and below a temperature of at least 20° C. below the melting point of said film.

7. The method of thermally processing a crystalline thermoplastic resin film according to claim 6, wherein the temperature for the first thermal process is above a temperature at which said film begins to contract and below a temperature of at least 30° C. below the melting point of said film.

8. A method of thermally processing a crystalline thermoplastic resin film comprising the steps of:
    biaxially orienting said crystalline thermoplastic resin film by a tubular method by forming a bubble of said resin film having first portions and second portions, said first portions of said bubble corresponding to portions of said resin film to be folded portions and being heated by a first heating means to a first temperature and said second portions of said bubble corresponding to portions of said resin film to be product portions and being heated by a second heating means to a second temperature, said first temperature being 10° to 100° C. lower than the average of said first and second temperatures and said second temperature being 10° to 100° C. higher than the average of said first and second temperatures;

folding the biaxially oriented crystalline thermoplastic resin film and advancing the folded film to a first thermal processing arrangement;

forming a bubble of the biaxially oriented crystalline thermoplastic resin film by a tubular method at the first thermal processing arrangement and heating the bubble to a temperature above the temperature at which the film begins to contract but below a temperature of at least 20° C. lower than the melting temperature of the film to thermally process the film;

folding the thermally processed film;

forming the thermally processed film into two parts by cutting the film at said folded portions;

forming a laminate of the two parts of said thermally processed film with air provided therebetween by plural sets of rollers having grooves provided on the periphery thereof; and advancing the laminate to a second thermal processing arrangement at which the laminate is heated to a temperature higher than the temperature of the first thermal processing arrangement but lower than the melting temperature of said film while being constrained in a tenter to produce a product crystalline thermoplastic resin film.

9. An apparatus for thermally processing a crystalline thermoplastic resin film comprising:
 means for biaxially orienting a crystalline thermoplastic resin film by a tubular method;
 means for folding said biaxially oriented thermoplastic resin film;
 first heating means for thermally processing film at a predetermined temperature;
 means for folding said thermally processed film;
 trimming means for dividing said film into two parts by cutting side portions thereof;
 means for forming a laminate of said two film parts with air provided therebetween; and
 second heating means for thermally processing the film parts at a temperature above the temperature in the first heating means and below the melting point of said film.

10. The apparatus for thermally processing a crystalline thermoplastic resin film according to claim 9, wherein said means for biaxially orienting a crystalline thermoplastic resin film comprises a heater for heating portions of said film corresponding to portions of said film to be folded and a heater for heating portions of said film corresponding to portions of said film to be products.

11. The apparatus for thermally processing a crystalline thermoplastic resin film according to claim 10, wherein the temperature of the heater heating the folded portions of said film controlled to be 10° to 100° C. lower than an average temperature of all the heaters.

12. The apparatus for thermally processing a crystalline thermoplastic resin film according to claim 10, wherein the temperature of the heater heating the portion of said film used as a product is controlled to be 10° to 100° C. higher than an average temperature of all the heaters.

13. The apparatus for thermally processing a crystalline thermoplastic resin film according to claim 9, wherein said first heating means is operated under a tubular method and above a temperature at which said film begins to contract and below a temperature of at least 20° C. below the melting point of said film.

14. The apparatus for thermally processing a crystalline thermoplastic resin film according to claim 13, wherein the temperature in the first heating means is above a temperature at which said film begins to contract and below a temperature of at least 30° C. below the melting point of said film.

15. The apparatus for thermally processing a crystalline thermoplastic resin film according to claim 9, wherein the first heating means is operated under a tenter method above a temperature at which said film begins to contract and below a temperature of at least 30° C. below the melting point of said film.

16. The apparatus for thermally processing a thermoplastic resin film according to claim 9, wherein said first and second heating means each are provided with an air-heating furnace.

17. The apparatus for thermally processing a crystalline thermoplastic resin film according to claim 9, wherein said means for laminating the two film parts includes rollers, each having provided thereon a groove on its periphery for laminating the two film parts together with air between them.

* * * * *

UNITED STATES PATENT AND TRADEMARK OFFICE
CERTIFICATE OF CORRECTION

PATENT NO. : 5 158 637
DATED : October 27, 1992
INVENTOR(S) : Masao TAKASHIGE et al It is certified that error appears in the above-identified patent and that said Letters Patent is hereby corrected as shown below:

Column 12, line 44; change "lug" to ---folded---.

Signed and Sealed this

Eleventh Day of May, 1993

Attest:

MICHAEL K. KIRK

*Attesting Officer*   *Acting Commissioner of Patents and Trademarks*